United States Patent Office 3,825,434
Patented July 23, 1974

3,825,434
INTERNALLY COATED REACTION VESSEL AND PROCESS FOR COATING THE SAME
Alan R. Berens, Hudson, and Thomas R. Paxton, Akron, Ohio, assignors to The B. F. Goodrich Company, New York, N.Y.
No Drawing. Filed Oct. 27, 1972, Ser. No. 301,476
Int. Cl. B01j 1/20; B44d 1/14
U.S. Cl. 117—72                                                12 Claims

ABSTRACT OF THE DISCLOSURE

A reaction vessel having on the internal surfaces thereof an adhesive primer coating containing, for example, a phenolic resin, and an insolubilized hydrophilic film or coating over said primer coating containing, for example, a glyoxal cross-linked polyvinyl alcohol and the process for coating said internal surfaces whereby polymer build-up on said internal surfaces is substantially decreased.

BACKGROUND OF THE INVENTION

Various type chemical processes are commonly carried out in large, stirred vessels which are frequently provided with auxiliary equipment, such as heat transfer coils which enable heat to be supplied or extracted from the contents of the vessels. In many cases, however, such processes eventually produce undesirable deposits on the surfaces of the equipment with which the reaction mixtures come into contact. Such deposits interfere with the efficient transfer of heat to and from the interior of the vessels. Further, these deposits have a tendency to deteriorate and to partially fragment, resulting in contamination of the reaction mixture and the products produced therefrom. This problem is particularly prevalent in polymerization type reactions since the deposits, or "build-up" of solid polymer on reactor surfaces, not only interferes with heat transfer, but decreases productivity and adversely affects polymer quality.

The above-described problem has been a real one in the commercial production of polymers and copolymers of vinyl and vinylidene halides, when polymerized alone or with other vinylidene monomers having a terminal

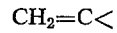

group or with polyolefinic monomers. For example, vinyl chloride polymers are produced commercially in the form of discrete particles by polymerization in suspension systems in water. When so polymerizing, the vinyl chloride, and other comonomers when used, are maintained in the form of small discrete droplets by the use of suspension agents and agitation. When the reaction is complete the polymer is washed and dried. These suspension system polymerization reactions are usually conducted under pressure in metal reactors equipped with baffles and high speed agitators. However, these suspension systems are inherently unstable and during the polymerization reaction, vinyl chloride polymer builds up on the interior surfaces of the polymerization reactor. Obviously this polymer build-up must be removed from the reactor surfaces or walls since it results in increased formation of polymer build-up on the reactor wall and this coagulum, the formation of insoluble particles, affects heat transfer and contaminates the polymer being produced.

The nature of the polymer build-up or insoluble deposit on the walls of the reactor is such that in the commercial production of polymers, as described above, it has been standard practice, after each polymerization reaction is completed, to have an operator enter the reactor and scrape the polymer build-up off the walls. This operation is not only costly, both in labor and down-time of the reactor, but presents potential health hazards as well. While various methods have heretofore been proposed to reduce the amount and nature of polymer build-up on polymerization reactor walls, such as solvent cleaning, for example, none have been entirely satsfactory and there is still a long felt want for an economical and satisfactory solution to this problem of unwanted polymer build-up in polymerization reactors.

SUMMARY OF THE INVENTION

We have now unexpectedly found that if an internally coated reactor is employed, undesirable polymer build-up on the internal surfaces can be substantially decreased. We have found that a first coating or adhesive primer containing a resin or polymer of the groups of phenolics, epoxies, cyanoacrylates and polyurethanes with an overlay film or coating thereon of an insolubilized hydrophilic polymer or resin, such as, for example, a coating containing a glyoxal cross-linked polyvinyl alcohol or gelatin, essentially prevents polymer build-up on the internal surfaces of the reactor.

DETAILED DESCRIPTION

In the practice of the present invention a hydrophilic polymer film or coating is applied to the inner surfaces of the polymerization reactor wherein aqueous suspension polymerization techniques are employed. The hydrophilic polymer coating provides a water layer on the surfaces thus repelling the monomer or monomers being polymerized and preventing the creating of sites for the build-up of polymer thereon. The hydrophilic polymer film or coating is readily insolubilized by the use of a cross-linking agent, such as formaldehyde, glyoxal, and the like. However, even after insolubilization, these films do not adhere to the surfaces when immersed in water. Accordingly, it is necessary to employ a primer or adhesive undercoating with the hydrophilic polymer coating.

The primer or base coating useful in the present invention is one containing an adhesive resin, that is, adhesive to stainless steel or glass, and the like, such as the low molecular weight phenol formaldehyde resins, epoxides, cyanoacrylates, polyurethanes, etc. The resin is dissolved in a suitable organic solvent therefor to give a solution that has a viscosity such that it can be sprayed on the surfaces or brushed on, as in the case of paint. Usually a coating solution having a solids content in the range of 2% to 25% by weight is satisfactory. Various additives may be employed in the primer such as plasticizers, curing agents, stabilizing agents, thinners, and the like when necessary. The addition of additives will depend upon the particular adhesive resin being used or combination of such resins, since more than one resin may be employed in any single primer coating.

As pointed out, an organic solvent is used to dissolve the adhesive resin and form a coating solution. This is true even in the case of low molecular weight phenol formaldehyde resins which are usually in liquid form. However, they are too viscous to apply as such and an organic solvent must be used to obtain the proper viscosity. Among the suitable solvents for making the primer coating there may be named, by way of example, the alcohols, such as ethyl alcohol, isopropyl alcohol, and the like; ketones, such as methyl ethyl ketone, and the like; esters, such as ethyl acetate, butyl acetate, etc.; N,N'-dimethylformamide, N,N' - dimethylacetamide, cyclohexanone, tetramethyl urea; aromatic and chlorinated hydrocarbons, such as trichloroethane, tetrachloroethane, trichloroethylene, methyl chloride, methylene chloride, chloroform, carbon tetrachloride, and the like; benzene, toluene, xylene, and the like, and naphthenic petroleum solvents, and many others which will be readily known to those skilled in the art. Also, mixtures of the above solvents can be employed.

The low molecular weight phenol formaldehyde resins are particularly adaptable for use in the primer coating of the present invention. However, other adhesive resins are likewise useful in the primer coating of this invention. For example, the epoxide resins which are polymers produced by the condensation of epichlorohydrin with bisphenol-A, which is 2,2-bis (4-hydroxyphenyl) propane. Such resins are readily available commercially from Shell Chemical Company under the trademark Epon® resins. The cyanoacrylates, when polymerized, are very useful among which are those having the formula:

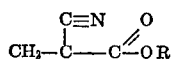

wherein R is an alkyl group containing from 1 to 6 carbon atoms. For example, there may be named cyanoethyl acrylate, cyanomethyl acrylate, cyanobutyl acrylate, and the like.

Various polyurethanes may usefully be employed in the primer coating such as those described in U.S. Pat. No. 2,871,218 which are organic solvent soluble. These polyurethanes comprise the reaction product obtained by heating a mixture comprising as essential ingredients (A) 1.0 mol of an essentially linear hydroxyl terminated polyester of a saturated, aliphatic glycol having from 4 to 10 carbon atoms and a dicarboxylic acid represented by the formula HOOC—R—COOH, wherein R is an alkylene radical containing from 2 to 8 carbon atoms, or the anhydride of the dicarboxylic acid, and (B) from about 1.1 to 3.1 mols of a diphenyl diisocyanate having an isocyanate group on each phenyl nucleus, and (C) from about 0.1 to 2.1 mols of a saturated, aliphatic free glycol containing from 4 to 10 carbon atoms and having hydroxyl groups on its terminal carbon atoms, the molar amount of the polyester and the free glycol combined being essentially equivalent to the molar amount of the diphenyl diisocyanate so that there are essentially no unreacted isocyanate or hydroxyl groups in the product. The diol serves as a chain extending constituent in the polymeric structure of the urethane elastomer.

For the top coating, or the polymer build-up prevention coating or film, a hydrophilic polymer is employed, that is, any polymer which will adhere to the primer coating and swell in water, i.e., which will absorb a quantity of water. The polymer must also be one that is readily insolubilized. Insolubilization of the polymer may be accomplished by employing a suitable cross-linking agent when making the same. In many instances, however, the hydrophilic polymer may be insolubilized by chemical reaction with the particular primer coating employed. Suitable polymers and compounds for the practice of the present invention are, for example, polyvinyl alcohol, gelatin, methyl cellulose, carboxy methyl cellulose, polyethylene oxide, polyvinyl pyrrolidone, polyacrylic acid, and other polyelectrolytes, such as polymethacrylic acid, polyethacrylic acid, polychloroacrylic acid, polycrotonic acid, polycyanoacrylic acid, and the like.

Both the primer coating and the hydrophilic polymer top coating are made by conventional methods, using heat and agitation where necessary. Either a single organic solvent is used or a combination of solvents may be used depending upon the particular resin or polymer being employed. In some instances it is possible to employ water as a solvent for the hydrophilic polymer where the same is water soluble. In the case of the top coating, the insolubilizing or cross-linking agent for the hydrophilic polymer is preferably added to the coating solution. However, it may be applied separately, if so desired.

The choice of the resin for the primer coat, and particularly the choice of the hydrophilic polymer or resin for the top coating, will depend upon the characteristics of the reaction mixture with which the coating is to come in contact. In general, however, the coating should be insoluble in the reaction mixture and, in addition, it is necessary that the coating remain substantially chemically unaffected in the presence of the components of the reaction, that is, it should be substantially inert under reaction conditions.

The primer coating and top coating may be applied to the interior surfaces of the reaction vessel in any convenient manner, such as spraying, brushing on, and the like. Brushing has been found to be satisfactory since it insures complete coverage of all surfaces. Any uncovered areas, such as pinholes, etc., should be avoided since such exposed areas provide sites for polymer build-up. More than one layer of the primer coating or the top coating, or both, may be applied. In many instances plural layers is desirable since it insures complete coverage. The amount of coating applied or the thickness thereof, is not particularly critical. However, for economic reasons, as thin a coating as possible should be applied to the surfaces to be protected but still complete coverage. It should be borne in mind that in addition to coating the interior surfaces or walls of the reaction vessel, all other parts therein should likewise be coated, such as baffles, agitator shaft and blades, heating coils, temperature probes, and the like. Suffice it to say that a sufficient amount of coating should be employed to obtain a continuous film over all interior surfaces of the reaction vessel with no areas of said surfaces remaining unprotected.

Following the application of the coating of the interior surfaces of the reaction vessel, the coating is heated in order to dry and cure the same. Any suitable heating method may be employed, such as radiant heating, heated air, and the like. Usually temperatures within the range of 75° C. to about 150° C. are sufficient. The temperature chosen will depend upon the time of drying. Thereafter, the reaction to be carried out in the equipment may be commenced immediately, no particular modifications of processing techniques being required due to the presence of the coating. Further, utilization of the internally coated reaction vessel of the present invention does not adversely affect the heat stability or other physical and chemical properties of the polymers produced therein. Ordinary care should, of course, be exercised to avoid rough, physical contact with the coated surfaces because of the damage to the film which may result from such contacts.

While the present invention is specifically illustrated hereinafter with regard to the suspension polymerization of vinyl chloride, it is to be understood that the apparatus and process may likewise be applied in the polymerization in aqueous dispersion or suspension of any polymerizable ethylenically unsaturated monomer or monomers where undesirable polymer build-up occurs. Examples of such monomers are other vinyl halides and vinylidene halides, such as vinyl bromide, vinylidene chloride, etc.; vinylidene monomers having at least one terminal $CH_2=CH<$ grouping, such as esters of acrylic acid, for example methyl acrylate, ethyl acrylate, butyl acrylate, octyl acrylate, cyanoethyl acrylate, and the like; esters of methacrylic acid such as methyl methacrylate, butyl methacrylate, and the like; styrene and styrene derivatives including α-methyl styrene, vinyl toluene, chlorostyrene; vinyl naphthalene; di-olefins including butadiene, isoprene, chloroprene, and the like; and mixtures of any of these types of monomers and other vinylidene monomers copolymerizable therewith; and other vinylidene monomers of the type known to those skilled in the art.

The present invention, however, is particularly applicable to the suspension polymerization of vinyl chloride, either alone or in admixture with one or more other vinylidene monomers copolymerizable therewith in amounts as great as about 80% or more by weight based on the weight of the monomer mixture, since polymer build-up in the reaction vessel is a particularly bad problem here.

In the specific examples, that follow hereinafter, the anti-build-up coatings were evaluated by coating stainless steel strips and mounting them as baffles in the polymerization reactor. Each strip was ⅜ inch wide and 10 inches long. A two liter glass reactor was employed with a stirrer or agitator having two paddle blades thereon. The strips or baffles were held in place in the reactor by slip fitting them in brackets which, in turn, were welded to rings, the brackets and rings being made of stainless steel. The assembly was mounted in the reactor so as to give a ⅛ inch clearance between the rings and the reactor walls and a ⅛ inch clearance between the baffles and the agitator paddle blades.

The following specific examples are intended to be illustrative and not limitative. In the examples, all parts and percents are by weight unless otherwise indicates.

EXAMPLE I

In this Example 5 baffles were employed in the reaction or polymerization vessel, one of which was uncoated and referred to as the "control." Each of the other baffles was treated differently in order to have comparative results and determine the best method of coating. The 5 baffles were treated as follows:

Baffle No. 1. Uncoated (Control).

Baffle No. 2. A light coating of a 5% solution of B stage phenolic resin (low molecular weight phenol formaldehyde resin) in isopropyl alcohol was brushed on and then dried in an air-oven at 100° C. for 5 minutes; then dipped in a 3% solution of glyoxal in hydrochloric acid for 1 minute and dried 2 minutes at 100° C.; then a 5% aqueous solution of Elvanol 50-42 (88% hydrolyzed polyvinyl acetate-polyvinyl alcohol) was brushed on and dried at 100° C. for 2 minutes; thereafter the glyoxal dipping and Elvanol brushing was repeated and the coated baffle dried for 1 hour at 100° C.

Baffle No. 3. Primed and dried like Baffle No. 2; then a 5% aqueous solution of Elvanol 50-42 containing 10 drops per 21 ml. of a 3% solution of glyoxal in hydrochloric acid was brushed on; then a 5% Elvanol 50-42 solution containing 2 drops per 20 ml. of said glyoxal solution brushed on; then dried for 5 minutes at 100° C.; thereafter a final coating of straight 5% Elvanol 50-42 was brushed on and dried for 10 minutes at 100° C.

Baffle No. 4. Primed like Baffle No. 1 and dried 5 minutes at 100° C.; a second coat of primer was applied and allowed to dry at room temperature; then a 5% aqueous solution of Elvanol 50-42 containing 2 drops per 20 ml. of a 3% solution of glyoxal in hydrochloric acid was brushed on and dried at 100° C. for 15 minutes.

Baffle No. 5. Primed like Baffle No. 1 and dried 5 minutes at 100° C.; a second coat of primer was applied and allowed to dry at room temperature; then a 5% aqueous solution of gelatin containing 2 drops per 20 ml. of a 3% solution of glyoxal in hydrocholric acid was brushed on and dried for 5 minutes at 100° C.; then a second coat of the same gelatin solution was brushed on and dried 15 minutes at 100° C.

Prior to insertion into the polymerization reactor, each of the baffles was weighed. At the end of the reaction the baffles were again weighed to determine the amount of polymer adhering thereto.

A 2 liter glass polymerization reactor was used in this Example which, in addition to the baffles, was equipped with an agitator having 2 paddles on the shaft thereof. The reactor was purged of air by sweeping it with nitrogen. Thereafter the reactor was initially charged with the following:

| | Parts |
|---|---|
| Vinyl chloride | 100 |
| Water | 50 |
| Methyl cellulose (1% solution in water) | 0.2 |
| Sorbitan monooleate | 0.6 |
| Trisodium salt of ethylenediamine tetraacetic acid | 0.01 |
| n-Butane | 1.00 |
| Diisopropyl peroxy dicarbonate | 0.05 |

The reactor was heated to 50° C. and the agitator operated at 50 r.p.m. After 30 minutes' operation the following was charged to the reactor:

| | Parts |
|---|---|
| Water | 150 |
| Methyl cellulose (1% solution in water) | 0.15 |

The agitator speed was increased to 500 r.p.m.

In charging the reactor the water is dispersed in the vinyl chloride. Thus, the vinyl chloride is the continuous phase. This is referred to as an inversion polymerization process in which polymer build-up is a particularly troublesome problem.

The reaction was allowed to proceed to a conversion of vinyl chloride to polyvinyl chloride of 71.1% over a period of 6 hours. The polymer was removed and the baffles removed and rinsed with water to remove the loose polymer. Thereafter, the baffles, with varying amounts of polymer adhering to them, were dried and weighed. The results were as follows:

| Baffle No.: | Deposit Grams of Polymer |
|---|---|
| 1 (Control) | 14.31 |
| 2 | 0.94 |
| 3 | 0.12 |
| 4 | 0.02 |
| 5 | 0.33 |

It will be noted that all the baffles which had a prime coat and a top coat, namely, baffles 2, 3, 4, and 5, showed practically no polymer build-up by comparison to the control baffle 1.

EXAMPLE II

In this Example the following coating solutions were prepared:

"Primer": 5% solution of low molecular weight (liquid) phenol formaldehyde resin in isopropanol.

"Topcoat A": 5% solution of polyvinyl alcohol (Elvanol 50-42) plus 2 drops per 20 ml. of 3% glyoxal in hydrochloric acid, i.e., 5% Elvanol 50-42 plus 0.02% glyoxal.

"Topcoat B": 5% solution of Elvanol 50-42 in isopropanol plus 0.1% glyoxal (from 3% solution in hydrochloric acid).

"Topcoat C": 5% aqueous solution of gelatin plus 0.02% glyoxal (from 3% solution in hydrochloric acid).

Using the above coatings the baffles were treated as follows prior to insertion into the polymerization reactor:

Baffle No. 1. Uncoated (Control).

Baffle No. 2. Brush on Primer and dry 5 minutes at 100° C.; apply second Primer coat; dry at room temperature; brush on Topcoat A and dry 15 minutes at 100° C.

Baffle No. 3. Primer same as No. 2; Topcoat C and dry 15 minutes at 100° C.

Baffle No. 4. Primer same as No. 2; Topcoat A and dry 1 hour at 50° C.

Baffle No. 5. Primer same as No. 2; Topcoat C and dry 1 hour at 50° C.

Again, as in Example I, the baffles were weighed after being coated and prior to insertion into the reactor. The same reactor, as used in Example I was employed here and was charged with the following:

| | Parts |
|---|---|
| Vinyl chloride | 100 |
| Water | 200 |
| Elvanol 50-42 | 0.1 |
| n-Butane | 1.0 |
| Diisopropyl peroxy dicarbonate | 0.05 |

The polymerization procedure employed here was a standard suspension polymerization procedure with the vinyl chloride being dispersed in the water. The reaction was conducted at 50° C. for approximately 5.5 hours with the agitator operating at 500 r.p.m. The conversion of vinyl chloride to polyvinyl chloride was 73.8%. The baffles were removed and rinsed, with the exception of baffles 2 and 3 which were to be used without cleaning in the next run, described in Example III. After drying the baffles were weighed with the following results:

| Baffle No.: | Deposit Grams of Polymer |
|---|---|
| 1 (Control) | 0.06 |
| 4 | 0.01 |
| 5 | 0.01 |

Again, it can be seen that the coating substantially decreased build-up of polymer by comparison to the control (Baffle 1). In a standard polymerization, as employed in this Example II, the build-up problem is not as severe as in the case of inversion polymerization, as employed in Example I.

EXAMPLE II

In this Example, the same coating solutions as recited in Example II were used and the polymerization recipe set out in Example I was employed. The baffles were treated as follows prior to insertion into the polymerization reactor:

Baffle No. 1. Uncoated (Control).

Baffle No. 2. Used Baffle No. 2 from Example II as was without cleaning and recoating.

Baffle No. 3. Used Baffle No. 3 from Example II as was without cleaning and recoating.

Baffle No. 4. Brush on Primer and dry 5 minutes at 100° C.; apply second Primer coat; dry at room temperature; brush on Topcoat B and dry 15 minutes at 100° C.

The polymerization reaction was carried out as outlined in Example I for approximately 6 hours with a conversion of vinyl chloride to polyvinyl chloride of about 74.0%. After drying the baffles were weighed with the following results:

| Baffle No.: | Deposit Grams of Polymer |
|---|---|
| 1 (Control) | 7.80 |
| 2 | 3.78 |
| 3 | 2.42 |
| 4 | 0.07 |

Again, the figures show that coating substantially decreases the polymer build-up problem. However, more importantly, the polymer on Baffles 2 and 3, which were Baffles 2 and 3 from Example II without being cleaned and recoated, show that more than one polymerization run can be made in the same reactor without shut-down for cleaning. The Baffles 2 and 3 were still better than 50% cleaner than the control Baffle 1.

EXAMPLE IV

In this Example, as in Example I, the polymerization reactor was initially charged with the following:

| | Parts |
|---|---|
| Vinyl chloride | 100 |
| Water | 50 |
| Methyl cellulose (1% solution in water) | 0.05 |
| Sorbitan monooleate | 0.6 |
| Trisodium salt of ethylenediamine tetraacetic acid | 0.01 |
| n-Butane | 1.0 |
| Diisopropyl peroxy dicarbonate (IPP) | 0.05 |

After addition of IPP, the last to be added, the reactor was heated to 50° C. with slow agitation (agitator speed=50 r.p.m.). The agitator speed was gradually increased to 500 r.p.m. with the addition of the following:

| | Parts |
|---|---|
| Water | 150 |
| Methyl cellulose (1% solution in water) | 0.15 |

The reaction was allowed to proceed to a conversion of vinyl chloride to polyvinyl chloride of 70.0% over a period of 6 hours.

As in the previous Examples, the reactor contained baffles which had been precoated and weighed. The coating solutions employed were as follows:

"Primer": 5% solution of B stage phenolic resin in isopropyl alcohol.

A. 2% aqueous solution of polyvinyl alcohol (PVA) (4 gms. PVA in 200 gms. of water).

B. 0.3 gm. of 3% glyoxal in 1N HCl added to 50 gms. of coating A.

C. 1% aqueous solution of methyl cellulose (4000 cps.).

D. 0.3 gm. 3% solution of glyoxal in 1N HCl added to 100 ml. of coating C.

The baffles, 7 in all, were coated with the above coatings and dried as follows, after having applied the primer to all 7 baffles and drying:

1. Brushed on A, dried 5' @ 100° C., brushed on second coat of A and dried 15' @ 100° C.
2. Same as 1 using B.
3. Same as 1 using C.
4. No topcoat. Primer dried 15' @ 100° C.
5. Same as 1 using D.
6. Coated with B.
7. Coated with 2% gelatin solution containing 0.02% glyoxal (added in HCl).

After the completion of the polymerization, the baffles were removed, dried and weighed as in previous Examples. The results were as follows:

| Baffle No.: | Deposit Grams of Polymer |
|---|---|
| 1 | 0.80 |
| 2 | 0.63 |
| 3 | 1.13 |
| 4 | 2.76 |
| 5 | 0.71 |
| 6 | 2.89 |
| 7 | 0.28 |

All of these are far superior to the control of Example I in which a like polymerization recipe was employed under the same polymerization conditions. Baffles 1 and 3 demonstrate that a crosslinking agent in the topcoat is not necessary. The topcoat was insolubilized by the primer coating in these instances.

In this Example, polyvinyl chloride was made using the procedure of Example IV and the same recipe with the exception that di (sec-butyl) peroxydicarbonate was used as the catalyst in place of diisopropyl peroxydicarbonate. Coated baffles were employed, as in previous Example, using the following coating solutions:

Primers:
  A. 5% solution of B stage phenolic resin in isopropyl alcohol.
  B. 10% BRL-1100 (mixed methylol phenols from Union Carbide) plus 1% paratoluene sulfonic acid solution in isopropyl alcohol.
  C. 10% epoxy resin (epoxylated novolak from Ciba) plus 0.5% tri-dimethyl aminomethyl phenol solution in methyl ethyl ketone.

Topcoats:
  a. 5% solution of polyvinyl alcohol in water.
  b. 5% polyvinyl alcohol plus 0.5% paratoluene sulfonic acid solution in water.

The primers were brushed on the baffles and precured followed by brushing on the topcoats as follows:

| Baffle number | Primer | Precure | Topcoat | Cure |
|---|---|---|---|---|
| 1 | A | Air-dried | a | 15' at 150° C. |
| 2 | A | do | a | 60' at 125° C. |
| 3 | B | 5' at 75° C. | b | 60' at 75° C. |
| 4 | | Bare, no coatings | | Control. |
| 5 | B | 15' at 75° C. | b | 60' at 75° C. |
| 6 | C | Air-dried | a | 60' at 75° C. |
| 7 | C | do | a | 30' at 100° C. |

At the end of the polymerization the baffles were removed and dried and the following observations made:

No. 1. Trace of buildup on edges but faces were clean.
No. 2. Like No. 1 but a little more adhered buildup.
No. 3. Thin adhered buildup layer but lumps broke off easily.
No. 4. Control—heavy, tightly stuck and tough buildup lumps.
No. 5. Like No. 3.
No. 6. Thin skin over most of surface with some buildup particles.
No. 7. Like No. 6.

Substantial buildup reduction was shown by all the baffles having a primer plus topcoat thereon.

Coating of polymerization reactor internal surfaces in accordance with the present invention substantially reduces polymer buildup and thus results in increased production over a unit period of time. What little polymer does accumulate is not of the hard rough type and is easily removed by rinsing without employing the hard tedious scraping methods that are presently necessary in the art. Numerous other advantages of the present invention will be obvious to those skilled in the art.

While the present invention has been described in terms of its specific embodiments, certain modifications and equivalents will be apparent to those skilled in the art and are intended to be included within the scope of the present invention, which is to be limited only by the reasonable scope of the appended claims.

What is claimed is:

1. A process for substantially reducing the buildup of polymer on the internal surfaces of a reaction vessel which comprises coating said surfaces with an adhesive coating consisting essentially of a resin selected from the group consisting of phenolics, epoxides, polycyanoacrylates and polyurethanes, applying a hydrophilic coating over said adhesive coating which consists essentially of an insolubilized hydrophilic polymer selected from the group consisting of polyvinyl alcohol, gelatin, methyl cellulose, carboxy methyl cellulose, polyethylene oxide, polyvinyl pyrrolidone, polyacrylic acid, polymethacrylic acid, polyethacrylic acid, polychloroacrylic acid, polycrotonic acid and polycyanoacrylic acid, and drying and curing the hydrophilic coating.

2. A process as defined in claim 1 wherein the resin is a low molecular weight phenol formaldehyde resin.

3. A process as defined in claim 2 wherein the hydrophilic polymer is cross-linked polyvinyl alcohol.

4. A process as defined in claim 2 wherein the hydrophilic polymer is cross-linked gelatin.

5. A process as defined in claim 1 wherein the hydrophilic polymer is cross-linked polyvinyl alcohol.

6. A process as defined in claim 1 wherein the hydrophilic polymer is cross-linked gelatin.

7. A polymerization reaction vessel having on the internal surfaces thereof an adhesive coating consisting essentially of a resin selected from the group consisting of phenolics, epoxides, polycyanoacrylates and polyurethanes and superimposed on said adhesive coating a hydrophilic coating which consists essentially of an insolubilized hydrophilic polymer selected from the group consisting of polyvinyl alcohol, gelatin, methyl cellulose, carboxy methyl cellulose, polyethylene oxide, polyvinyl pyrrolidone, polyacrylic acid, polymethacrylic acid, polyethacrylic acid, polychloroacrylic acid, polycrotonic acid and polycyanoacrylic acid, whereby polymer buildup on said internal surfaces is substantially reduced.

8. A polymerization reaction vessel as defined in Claim 7 wherein the resin is a low molecular weight phenol formaldehyde resin.

9. A polymerization reaction vessel as defined in Claim 8 wherein the hydrophilic polymer is cross-linked polyvinyl alcohol.

10. A polymerization reaction vessel as defined in Claim 8 wherein the hydrophilic polymer is cross-linked gelatin.

11. A polymerization reaction vessel as defined in Claim 7 wherein the hydrophilic polymer is cross-linked polyvinyl alcohol.

12. A polymerization reaction vessel as defined in Claim 7 wherein the hydrophilic polymer is cross-linked gelatin.

References Cited

UNITED STATES PATENTS

| | | |
|---|---|---|
| 3,401,050 | 9/1968 | Scheibelhoffer et al. __ 117—97 X |
| 3,352,708 | 11/1967 | Lyon et al. _____ 117—72 |
| 3,160,676 | 12/1964 | Mabrey et al. _____ 117—72 X |

RALPH HUSACK, Primary Examiner

U.S. Cl. X.R.

23—285; 117—73, 74, 75, 81, 95, 97